United States Patent
Son

(10) Patent No.: US 8,581,689 B2
(45) Date of Patent: Nov. 12, 2013

(54) METHOD AND APPARATUS FOR SYNCHRONIZATION IN VEHICLE NETWORK

(75) Inventor: Jeong Ho Son, Youngcheon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 440 days.

(21) Appl. No.: 12/951,535

(22) Filed: Nov. 22, 2010

(65) Prior Publication Data

US 2011/0128117 A1     Jun. 2, 2011

(30) Foreign Application Priority Data

Nov. 30, 2009  (KR) .................. 10-2009-0116852

(51) Int. Cl.
*H04L 7/00*       (2006.01)
(52) U.S. Cl.
USPC ........................................... 340/4.2; 340/934
(58) Field of Classification Search
USPC ............. 340/4.2, 934, 5.8, 539.1, 572.1, 907, 340/933, 935, 936; 701/50, 117, 118, 119
See application file for complete search history.

(56) References Cited

U.S. PATENT DOCUMENTS

| | | | |
|---|---|---|---|
| 6,329,932 B1 * | 12/2001 | Fastenrath | 340/934 |
| 8,275,522 B1 * | 9/2012 | Groeneweg et al. | 701/50 |
| 2002/0062190 A1 * | 5/2002 | Hameleers et al. | 701/117 |
| 2002/0145541 A1 * | 10/2002 | Matsui et al. | 340/934 |

FOREIGN PATENT DOCUMENTS

| | | |
|---|---|---|
| JP | 2003-217096 | 7/2003 |
| KR | 20-0278378 | 5/2002 |
| KR | 10-0515952 | 9/2005 |
| KR | 10-2009-0027028 | 3/2009 |
| KR | 10-2009-0057766 | 6/2009 |
| WO | 2005/029438 | 3/2005 |

\* cited by examiner

*Primary Examiner* — Brian Zimmerman
*Assistant Examiner* — Omer S Khan
(74) *Attorney, Agent, or Firm* — Staas & Halsey LLP

(57) ABSTRACT

For synchronization between the wireless communication device of a vehicle and a synchronization device installed on a road in a vehicle network, when the passage of a vehicle is detected, the synchronization device generates and transmits a beacon signal for synchronization. That is, a synchronization signal is transmitted to the wireless communication device of the vehicle only when the vehicle is detected by the synchronization device installed at predetermined intervals on the road.

6 Claims, 4 Drawing Sheets

METHOD AND APPARATUS FOR SYNCHRONIZATION IN VEHICLE NETWORK

CROSS-REFERENCE TO RELATED APPLICATION

This application claims priority to and the benefit of Korean Patent Application No. 10-2009-0116852 filed in the Korean Intellectual Property Office on Nov. 30, 2009, the entire contents of which are incorporated herein by reference.

BACKGROUND OF THE INVENTION (a) Field of the Invention

The present invention relates to a method for synchronization in a vehicle network, and more particularly, to a method and apparatus for synchronization between objects communicating in a network.

(b) Description of the Related Art

Next-generation network technologies using wireless communication between a plurality of vehicles that provide networking between vehicles V2V or between a vehicle and a base station V2I on a road or networking between sensor nodes installed on a road or roadside and a vehicle have been developed and used.

To achieve synchronization in such a network, beacons are generally used. The beacons are used for synchronization between nodes, and, in general, are periodically transmitted.

As the time is checked continuously in order for a node to periodically transmit beacons, energy consumption of the node increases. Also, when a collision occurs between beacon signals transmitted between nodes, overhead caused by the processing of these signals is generated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for asynchronous synchronization in a vehicle network.

Further, a method and apparatus for synchronization in a vehicle network when a vehicle passes a certain point in the vehicle network are provided.

An exemplary embodiment of the present invention provides a method for synchronization in a vehicle network formed between wireless communication devices of vehicles traveling on a road, the method including: detecting a vehicle traveling on the road by a vehicle detection sensor installed at predetermined intervals; and when detecting the vehicle by the vehicle detection sensor, generating a beacon signal for synchronization by a synchronization device and transmitting the same to the wireless communication device of the vehicle. The wireless communication device of the vehicle performs synchronization based on the beacon signal.

Another exemplary embodiment of the present invention provides an apparatus for performing synchronization in a vehicle network formed with a wireless communication device of a vehicle travelling on a road, including: a charging unit for charging electrical energy in accordance with a signal generated from a vehicle detection sensor that outputs an electrical signal in response to pressure of the vehicle travelling on the road; a signal generation unit for generating a beacon signal for synchronization with the wireless communication device of the vehicle when the signal is output from the vehicle detection sensor; and a transmission/reception unit for transmitting the beacon signal to the wireless communication device of the vehicle and receiving a signal transmitted from the wireless communication device.

DETAILED DESCRIPTION OF THE EMBODIMENTS

Figure 1:
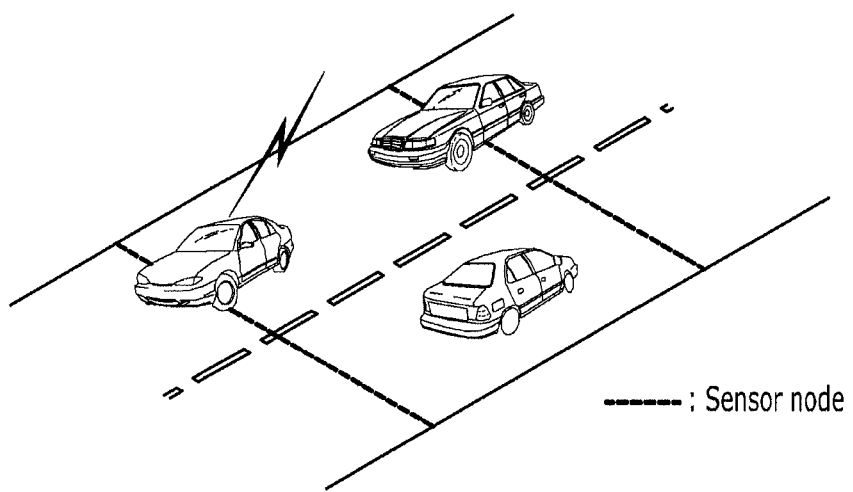
FIG. 1 is a view showing an implementation example of a vehicle network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Now, an exemplary embodiment of the present invention will be described with reference to the accompanying drawings.

FIG. 1 is a view showing an implementation example of a vehicle network according to an exemplary embodiment of the present invention.

As shown in the accompanying FIG. 1, in a vehicle network system according to the exemplary embodiment of the present invention, sensor nodes for vehicle detection and vehicles act as communication objects for performing communication.

The sensor nodes installed on a road surface where vehicles are traveling detect a vehicle travelling on the road, and in particular, the sensor nodes according to the exemplary embodiment of the present invention function to receive and collect data from vehicles in addition to vehicle detection. Accordingly, these sensor nodes are called apparatuses for performing synchronization in a vehicle network. Hereinafter, the apparatus for performing synchronization according to the exemplary embodiment of the present invention will be referred as "a synchronization device".

The synchronization devices 10 (see FIG. 2) according to the exemplary embodiment of the present invention are installed on a road where vehicles are traveling, for example, on a road on which traffic signal controllers are installed.

Figure 2:
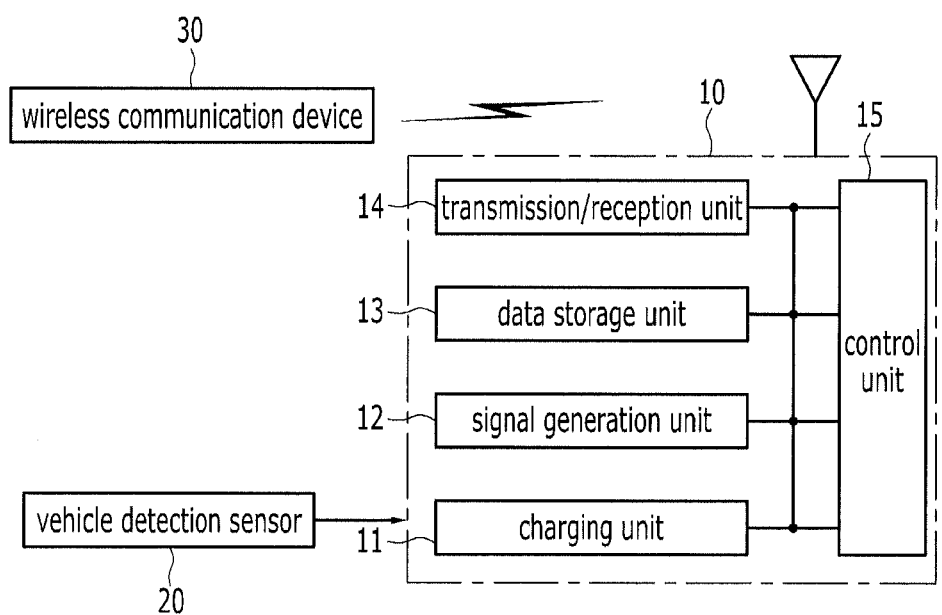
FIG. 2 is a view showing a structure of a synchronization device according to the exemplary embodiment of the present invention.

FIG. 2 is a view showing a structure of a synchronization device according to the exemplary embodiment of the present invention.

As shown in the accompanying FIG. 2, the synchronization device 10 according to the exemplary embodiment of the present invention includes a charging unit 11, a signal generation unit 12, a data storage unit 13, a transmission/reception unit 14, and a control unit 15, and operates in conjunction with a vehicle detection sensor 20. Moreover, the synchronization device 10 communicates with a wireless communication device 30 of a vehicle traveling on a road.

The vehicle detection sensor 20 detects a vehicle passing on a road. In the exemplary embodiment of the present invention, the vehicle detection sensor 20 consists of a piezoelectric sensor that detects a pressure generated by the weight of a vehicle and outputs a corresponding electrical signal. However, the vehicle detection sensor 20 according to the present invention is not necessarily limited to the piezoelectric sensor.

The charging unit 11 of the synchronization device 10 charges electrical energy in accordance with the electrical signal output from the vehicle detection sensor 20. The charged electrical energy is used as energy for operating the synchronization device 10. The charging unit 11 for charging electrical energy generated in accordance with the operation of the vehicle detection sensor 20 may be implemented in various forms, so a detailed description of a structure of the charging unit will be omitted.

When a signal of vehicle detection is generated from the vehicle detection sensor 20, the signal generation unit 12 generates a signal for synchronization in accordance with the control of the control unit 15 or a message signal containing predetermined data Here, a beacon signal, which is the signal for synchronization, is generated in such a manner as to contain predetermined information, and the contained information includes information indicating the presence or absence of a message, a message number, and so on. The beacon signal may be transmitted in the beacon transmission section that is an initial section of a super frame.

The transmission/reception unit 14 transmits a beacon signal provided from the signal generation unit 12.

The beacon signal transmitted from the synchronization device 10 having such a structure is received by the wireless communication device 30 of a traveling vehicle, and the wireless communication device 30 performs synchronization in accordance with the beacon signal and then selectively transmits a message containing information regarding the corresponding vehicle. The message transmitted from the wireless communication device 30 of the vehicle is received via the transmission/reception unit 14 of the synchronization device 10.

The synchronization device 10 according to the exemplary embodiment of the present invention is installed on a road where vehicles are traveling, and is also installed, along with the vehicle detection sensor 20, at the corresponding position. Here, the vehicle detection sensor 20 and the synchronization device 10 are separated from each other. In some cases, however, the synchronization device 10 may be implemented in such a manner as to include the vehicle detection sensor 20.

Based on this structure, a method for performing synchronization between the wireless communication device 30 installed at a vehicle and the synchronization devices 10 installed on a road surface in a vehicle network will be described below.

Figure 3:
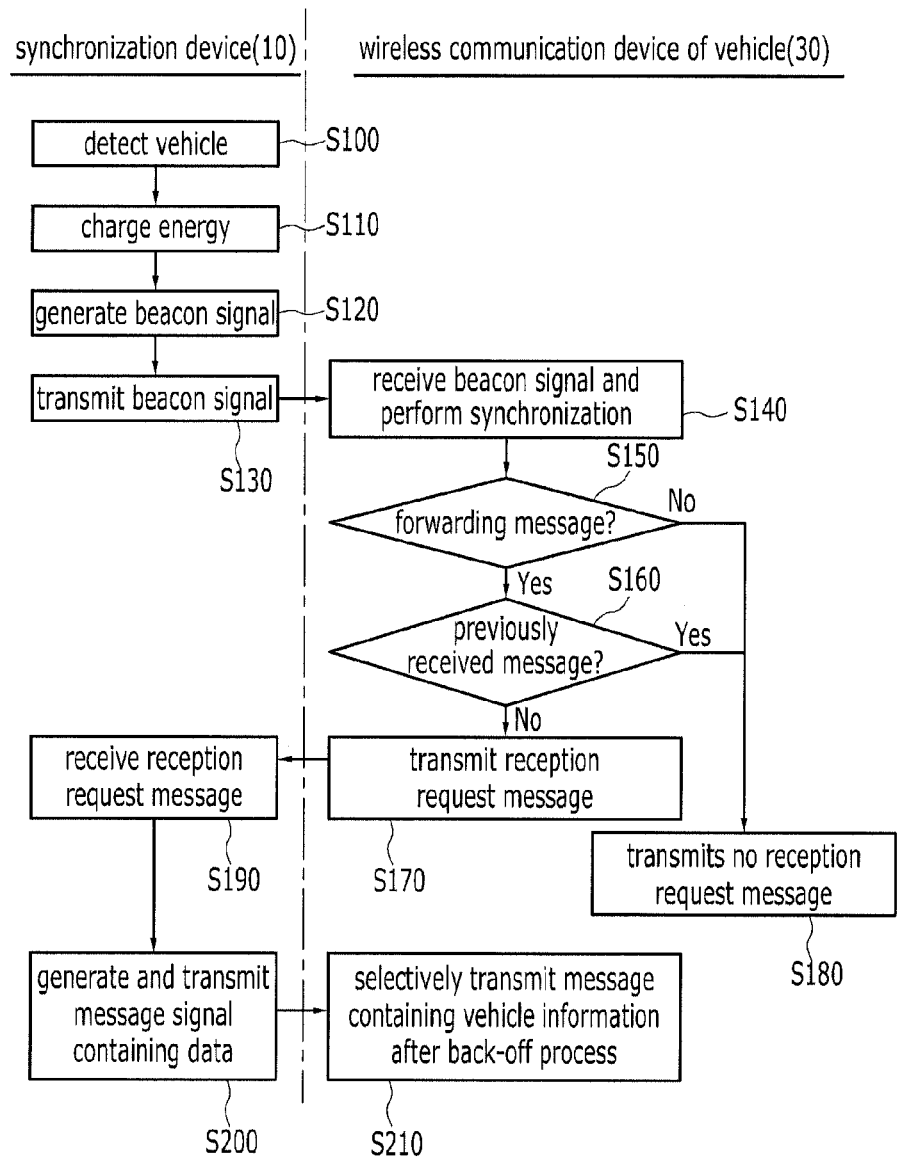
FIG. 3 is a flowchart showing a method for synchronization according to the exemplary embodiment of the present invention.

FIG. 3 is a flowchart showing a method for performing synchronization in a vehicle network according to the exemplary embodiment of the present invention.

Here, it is assumed that the synchronization devices 10 are installed along with the corresponding vehicle detection sensors 20 at predetermined positions, the synchronization devices 10 are installed at prescribed intervals from each other on a road surface, and vehicles are traveling on the road as shown in the accompanying FIG. 1.

When a vehicle traveling on the road passes the synchronization device 10 as shown in FIG. 1, the vehicle detection sensor 20 of the synchronization device 10 is operated by pressure exerted by the vehicle and outputs the corresponding electrical signal (S100). The output electrical signal is applied to the control unit 15, and electrical energy in accordance with the electrical signal is charged in the charging unit 11 (S110). The thus-charged energy is used as energy required to operate the synchronization device 10. Thus, the synchronization device can continuously operate without supplying energy by battery replacement.

Meanwhile, when a vehicle is detected by the vehicle detection sensor 20, the control unit 15 operates the signal generation unit 12 to generate a beacon signal for synchronization with the wireless communication device 30 of the vehicle (S120), and transmits the generated beacon signal through the transmission/reception unit (S130). The transmitted beacon signal contains information about the presence or absence of a forwarding message, the message number, and so on.

Upon receiving the beacon signal from the synchronization device 10, the wireless communication device 30 of the vehicle performs synchronization based on the beacon signal (S140), and performs the subsequent processing based on the information contained in the beacon signal.

Specifically, if information indicating the presence of a forwarding message is contained in the beacon signal, a reception request message requesting the corresponding message is generated and transmitted. The reception request message to be transmitted contains the message number contained in the beacon signal.

Moreover, the wireless communication device 30 of the vehicle checks the message number contained in the beacon signal. Even though the information indicating the presence of a forwarding message is contained in the beacon signal, if the message number contained in the beacon signal is the number of an already received message signal, no reception request message is generated and transmitted. Further, no reception request message is generated even when the information indicating the absence of a forwarding message is contained in the beacon signal.

In this way, if the information indicating the presence of a forwarding message is contained in the beacon signal and the number of the corresponding message does not match the number of a previously received message, the wireless communication device 30 of the vehicle transmits a reception request message (S150-S170), and if the above condition is not satisfied, no reception request message is transmitted (S180).

Upon receiving the reception request message transmitted from the wireless communication device 30 of the vehicle on which synchronization has been performed, through the transmission/reception unit 14 after transmitting the beacon signal (S190), the control unit 15 of the synchronization device 10 generates a message signal containing data to be forwarded by the signal generation unit 12. The generated message signal is transmitted to the wireless communication device 30 of the vehicle through the transmission/reception unit 14 (S200).

If the message signal transmitted from the synchronization device 10 is a message signal requesting information on the vehicle or the wireless communication device 30 of the vehicle itself wants to transmit the information on the vehicle, the wireless communication device 30 of the vehicle performs a back-off process after completion of the above synchronization process, and then generates and transmits a message signal containing vehicle information (S210). Such a message signal containing vehicle information may be received by the synchronization device 10 or the wireless communication device of another vehicle.

By this process, the synchronization device 10 performs synchronization by transmitting a beacon signal when a vehicle passes the installed position of the synchronization device 10, rather than by periodically transmitting a beacon signal, thereby preventing waste of energy unnecessarily consumed for synchronization.

Meanwhile, if the density of vehicles traveling on a road is low, i.e., the number of traveling vehicles is less than a given number, which means that there are very few vehicles, a message signal containing vehicle information transmitted from a vehicle having passed the installed position of the synchronization device 10 by the above-described synchronization process may not be received by the wireless communication device of another vehicle. At this point, the synchronization device 10 receives the message signal transmitted from the wireless communication device 30 of the vehicle, and stores the contained vehicle information in the data storage unit 13. Afterwards, when the passage of another vehicle is detected, the data stored in the data storage unit 13 is transmitted to the corresponding vehicle.

Figure 4:
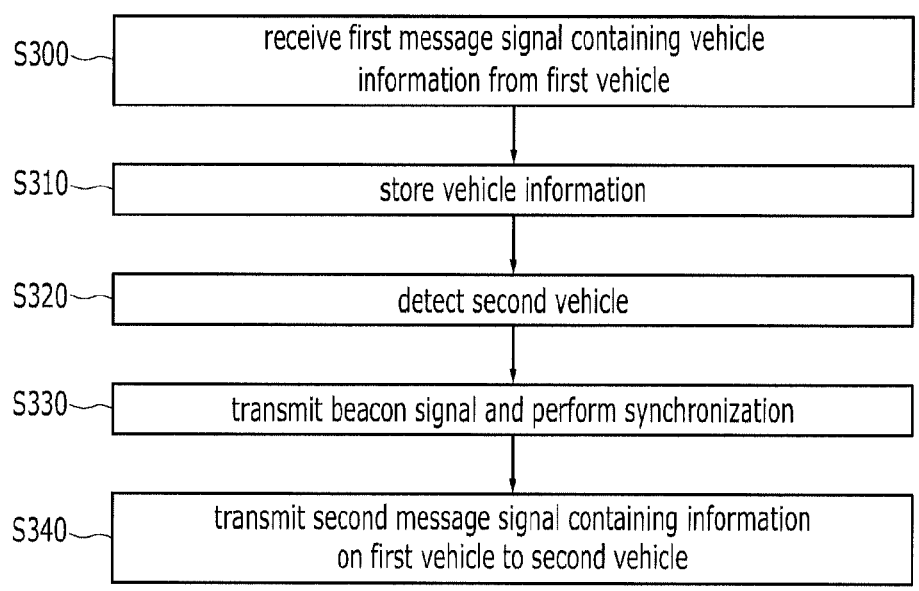
FIG. 4 is a flowchart showing a vehicle information processing process of the synchronization device according to the exemplary embodiment of the present invention.

FIG. 4 is a view showing a vehicle information processing process of the synchronization device 10 according to the exemplary embodiment of the present invention.

As shown in FIG. 4, after the synchronization device 10 performs the above-described synchronization process with the wireless communication device 30 of a first vehicle detected as passing is performed, when a first message signal containing vehicle information is transmitted from the wireless communication device 30 of the first vehicle (S300), the synchronization device 10 stores the first message signal in the data storage unit 13 (S310).

Afterwards, if it is detected that a second vehicle is passing (S320), the synchronization device 10 transmits a beacon signal again to the wireless communication device 30 of the second vehicle to perform a synchronization process (S330), and transmits the information on the first vehicle stored in the data storage unit 13 to the wireless communication device of the second vehicle (S340).

When information is exchanged between vehicles by this process, smooth communication and information exchange between the vehicles is achieved even in an area where the density of vehicles is low. Moreover, the synchronization device 10 does not always transmit vehicle information but transmits information only upon detecting a vehicle, thereby preventing unnecessary energy consumption.

The synchronization device according to the exemplary embodiment of the present invention can be implemented in conjunction with a network controller (not shown) for controlling a vehicle network. In this case, the synchronization device can be operated under the control of the network controller, and may include at least one relay apparatus (not shown) for relaying signal transmission and reception between each synchronization device and the network controller. Accordingly, information on the vehicles collected by the synchronization devices may be directly transmitted to the network controller under a predetermined condition, such as every predetermined time or each time an event occurs, or may be transmitted to the network controller through a relay apparatus.

According to the exemplary embodiment of the present invention, by outputting a beacon signal only when a vehicle passes a specific point in the vehicle network, the consumption of standby power required to check a predetermined condition for outputting a beacon signal can be prevented, and the collision between beacon signals occurring when each node periodically transmits beacon signals can be effectively prevented.

Moreover, by charging electrical energy generated when a vehicle passes a vehicle detection sensor and performing communication based on the electrical energy, energy consumed for synchronization can be efficiently used, and continuous communication can be done based on the charged energy.

Further, the probability of collision between beacon signals transmitted from vehicles passing vehicle detection sensors can be efficiently adjusted by adjusting the intervals at which the vehicle detection sensors are installed on the road surface, thereby reducing the collision between beacon signals. As a result, beacon signals transmitted from a certain node are not processed due to the collision between the beacon signals, and therefore energy consumption occurring when the node retransmits beacon signals can be reduced.

The exemplary embodiment of the present invention is not implemented only by a device and/or method, but can be implemented through a program for realizing functions corresponding to the configuration of the exemplary embodiment of the present invention and a recording medium having the program recorded thereon. Such implementation can be easily made by a skilled person in the art to which the present invention pertains from the above description of the exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for synchronization in a vehicle network formed between wireless communication devices of vehicles traveling on a road, the method comprising:
    detecting a vehicle traveling on the road by a vehicle detection sensor installed at predetermined intervals; and
    when detecting the vehicle by the vehicle detection sensor, generating a beacon signal for synchronization by a synchronization device and transmitting the same to the wireless communication device of the vehicle,
    wherein the wireless communication device of the vehicle performs synchronization based on the beacon signal;
    wherein the beacon signal contains information indicating presence or absence of a forwarding message and an identification number of the corresponding message;
    if the information indicating the presence or absence of a forwarding message is contained in the beacon signal, the wireless communication device of the vehicle generating and transmitting a reception request message requesting transmission of the message;
    if the identification number of the message contained in of the beacon signal does not match an identification number of a previously received message, the wireless communication device of the vehicle transmits the reception request message.

2. A method for synchronization in a vehicle network formed between wireless communication devices of vehicles traveling on a road, the method comprising:
    detecting a vehicle traveling on the road by a vehicle detection sensor installed at predetermined intervals; and when detecting the vehicle by the vehicle detection sensor, generating a beacon signal for synchronization by a synchronization device and transmitting the same to the wireless communication device of the vehicle;

wherein the wireless communication device of the vehicle performs synchronization based on the beacon signal;

wherein the beacon signal contains information indicating presence or absence of a forwarding message and an identification number of the corresponding message;

if the information indicating the presence or absence of a forwarding message is contained in the beacon signal, the wireless communication device of the vehicle generating and transmitting a reception request message requesting transmission of the message;

upon receiving the reception request message from the wireless communication device of the vehicle, the synchronization device transmitting a message containing predetermined data to the wireless communication device, wherein the message signal contains vehicle information collected from vehicles having previously passed on the road.

3. The method of claim 1, further comprising, upon receiving the reception request message from the wireless communication device of the vehicle, the synchronization device transmitting a message containing predetermined data to the wireless communication device, wherein the message signal contains vehicle information collected from vehicles having previously passed on the road.

4. The method of claim 2, further comprising: the synchronization device receiving a message signal containing information of the corresponding vehicle from the wireless communication device of the vehicle having received the message signal; and the synchronization device storing the vehicle information contained in the received message signal.

5. The method of claim 3, further comprising: the synchronization device receiving a message signal containing information of the corresponding vehicle from the wireless communication device of the vehicle having received the message signal; and the synchronization device storing the vehicle information contained in the received message signal.

6. An apparatus for performing synchronization in a vehicle network formed with a wireless communication device of a vehicle travelling on a road, including:

a charging unit for charging electrical energy in accordance with a signal generated from a vehicle detection sensor that outputs an electrical signal in response to pressure of the vehicle travelling on the road;

a signal generation unit for generating a beacon signal for synchronization with the wireless communication device of the vehicle when the signal is output from the vehicle detection sensor; and street a transmission/reception unit for transmitting the beacon signal to the wireless communication device of the vehicle and receiving a signal transmitted from the wireless communication device;

a data storage unit for storing vehicle information contained in a message transmitted from the wireless communication device of the vehicle on which synchronization has been performed.

wherein, upon receiving a reception request message from the wireless communication device of the vehicle, the message signal containing the vehicle information stored in the data storage unit is transmitted to the wireless communication device through the transmission/reception unit.

* * * * *